(12) United States Patent
Chang et al.

(10) Patent No.: US 7,521,145 B2
(45) Date of Patent: Apr. 21, 2009

(54) FUEL CELLS FOR USE IN PORTABLE DEVICES

(75) Inventors: Shung-Huei Chang, Taipei Hsien (TW); Wen-Fa Tseng, Taipei Hsien (TW)

(73) Assignee: Wistron Corp. (TW)

( * ) Notice: Subject to any disclaimer, the term of this patent is extended or adjusted under 35 U.S.C. 154(b) by 583 days.

(21) Appl. No.: 10/687,232

(22) Filed: Oct. 16, 2003

(65) Prior Publication Data

US 2005/0084736 A1    Apr. 21, 2005

(51) Int. Cl.
H01M 8/02    (2006.01)
H01M 8/10    (2006.01)

(52) U.S. Cl. .......................... 429/38; 429/34; 429/32

(58) Field of Classification Search ............... 427/115; 429/34, 39, 32, 38

See application file for complete search history.

(56) References Cited

U.S. PATENT DOCUMENTS

| | | | | |
|---|---|---|---|---|
| 6,127,058 A * | 10/2000 | Pratt et al. | ............ | 429/30 |
| 6,218,035 B1 | 4/2001 | Fuglevand et al. | ............ | 429/30 |
| 6,465,119 B1 | 10/2002 | Koripella et al. | ............ | 429/32 |
| 6,638,654 B2 * | 10/2003 | Jankowksi et al. | ............ | 429/26 |
| 6,960,403 B2 * | 11/2005 | Morse et al. | ............ | 429/39 |
| 7,033,691 B2 * | 4/2006 | Mardilovich et al. | ............ | 429/30 |
| 7,081,317 B2 * | 7/2006 | Fujii et al. | ............ | 429/40 |
| 2002/0132151 A1 | 9/2002 | Choi | ............ | 429/32 |
| 2003/0059660 A1 | 3/2003 | Kamo et al. | ............ | 429/32 |
| 2005/0019635 A1 * | 1/2005 | Arroyo et al. | ............ | 429/32 |
| 2006/0115706 A1 | 6/2006 | Maeda et al. | ............ | 429/38 |

FOREIGN PATENT DOCUMENTS

| | | |
|---|---|---|
| DE | 19624887 A1 * | 1/1997 |
| JP | 11045729 A * | 2/1999 |
| WO | WO 02080299 A1 * | 10/2002 |

* cited by examiner

*Primary Examiner*—Gregg Cantelmo
(74) *Attorney, Agent, or Firm*—Ware, Fressola, Van Der Sluys & Adolphson, LLP (57) ABSTRACT

A fuel activation assembly disposed between two fuel compartments in a fuel cell, such as a direct methanol fuel cell. The fuel activation assembly comprises a substrate with apertures for securely attaching a plurality of membrane electrode assembly (MEA) segments. Each MEA segment has a proton exchange membrane (PEM) sandwiched between two electrodes to allow protons produced in one fuel compartment to migrate to the other fuel compartment through the aperture. If the fuel cell becomes non-functioning due to the damage in the fuel activation assembly, it is possible to replace only the defective MEA segments. With a number of MEA segments, the electrodes on the two sides of the PEM can be electrically connected in series or in parallel or in a combination thereof.

21 Claims, 9 Drawing Sheets

FUEL CELLS FOR USE IN PORTABLE DEVICES

FIELD OF THE INVENTION

The present invention relates generally to fuel cells for use in a portable electronic device and, more particularly, to the method for fabricating such fuel cells.

BACKGROUND OF THE INVENTION

Figure 1:
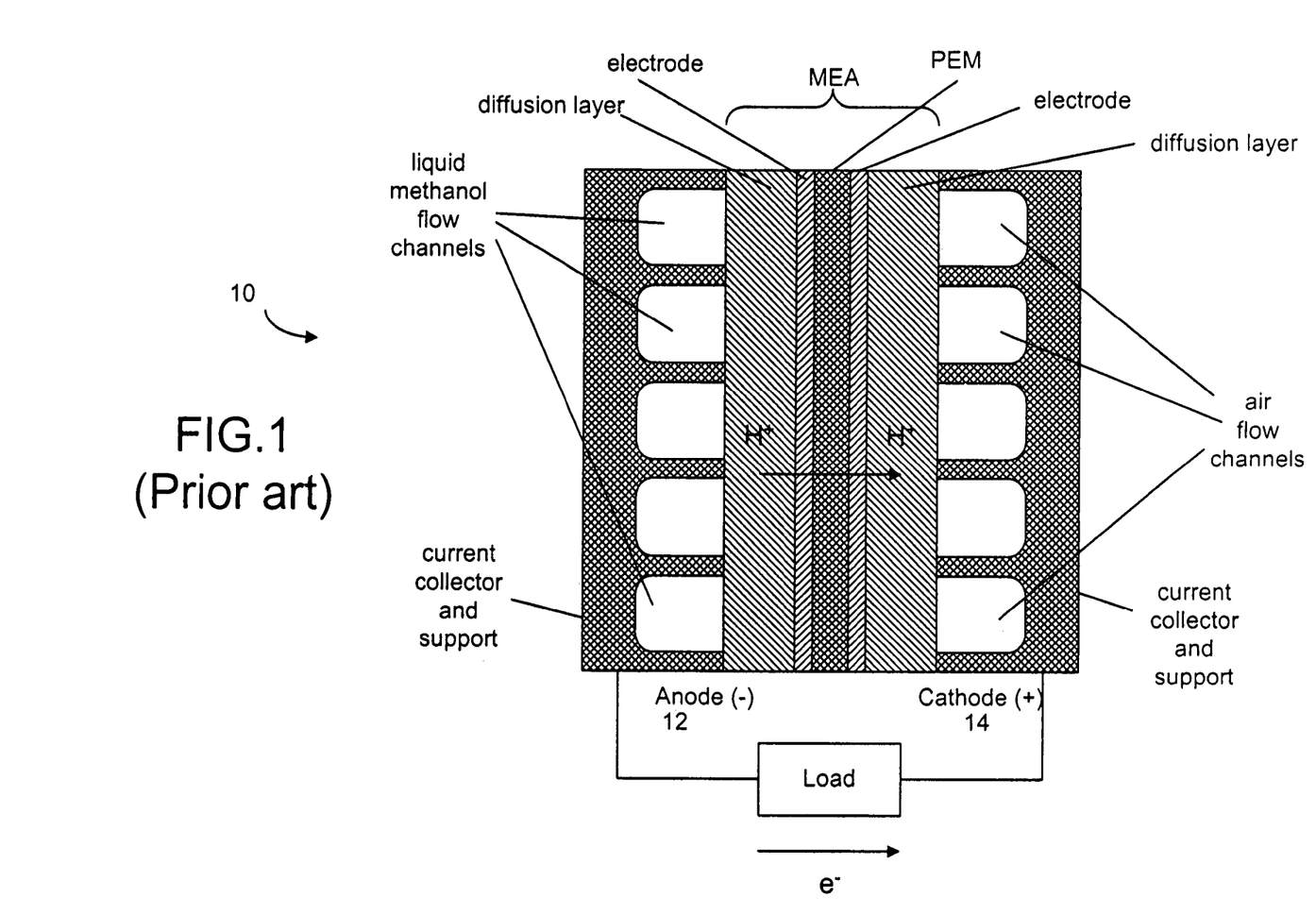
FIG. 1 is a schematic representation showing a prior art direct methanol fuel cell.

A fuel cell works like a battery but does not run down or need recharging so long as the fuel is continually fed to the cell. In a direct methanol fuel cell (DMFC), methanol is used as a fuel, which is put in on one side of the fuel cell while air circulates on the other side. The two sides are separated by a membrane electrode assembly (MEA), which has a proton exchange membrane (PEM) sandwiched between two electrodes. As shown in FIG. 1, a fuel cell 10 includes an anode side 12 where a mixture of methanol (MeOH) and water ($H_2O$) (also referred to as liquid methanol) is circulated around the anode (−). On the cathode side 14, air is circulated around the cathode (+). Through catalytic activation at the MEA, hydrogen atoms from the liquid methanol separate into protons (H+) and electrons (not shown). The electrons become the source of electricity provided by the fuel cell. Some of the protons migrate through the membrane assembly to the cathode side 14, where they combine with oxygen and become water. While the byproduct of the spent fuel, $CO_2$, on the anode side is easily vented out of the fuel cell, the byproduct, water, on the cathode side must be properly taken away.

A major advantage of fuel cells over rechargeable batteries is that fuel cells can generally operate for longer periods of time without recharging. Furthermore, "recharging" a fuel cell can be accomplished almost instantaneously by refueling with liquid methanol. In contrast, recharging a battery takes hours to complete.

Currently, a DMFC is made of a single MEA, wherein a single PEM is used. The MEA and the PEM are usually designed to suit the dimensions of the portable device. If the PEM in a fuel cell is defective, rendering the fuel cell non-functioning, the MEA or the entire PEM must be replaced. It is thus advantageous and desirable to provide a fuel cell wherein the MEA can be repaired without discarding the entire PEM in order to reduce the associated cost.

SUMMARY OF THE INVENTION

It is a primary objective of the present invention to reduce the cost in fabricating and repairing a fuel cell for use in a portable device, such as a laptop PC, notebook PC or tablet PC. This objective can be achieved by disposing a plurality of PEM segments such that only the defective segments will be replaced in a non-functioning direct methanol fuel cell.

Thus, according to the first aspect of the present invention, there is provided a method of fabricating a fuel activation assembly for use in a fuel cell, the fuel cell comprising a first cell compartment for containing a first fuel component and a second cell compartment for containing a second fuel component, wherein the fuel activation assembly is disposed between the first cell compartment and the second cell compartment so as to activate the first fuel component for producing protons in the first cell compartment and for channeling the protons to the second cell compartment. The method comprises the steps of:

providing a substrate having a plurality of apertures; and securely attaching a plurality of membrane electrode assembly segments to the substrate over the apertures, wherein each membrane electrode assembly segment has a first side and an opposing second side, the second side adjacent to the second cell compartment, the first side adjacent to the first cell compartment for activating the first fuel component in order to produce the protons and for channeling at least part of the protons from the first cell compartment to the second cell compartment via the apertures through the membrane electrode assembly segments.

The attachment of the membrane electrode assembly segments to the substrate can be achieved by a heat bonding process or by applying an adhesive layer, creating a barrier separating the first side from the second side of each membrane electrode segment, thereby preventing the first fuel component from entering the second cell compartment and the second fuel component from entering the first cell compartment. The adhesive is resistant to the fuel components.

According to the second aspect of the present invention, there is provided a fuel cell, which comprises:

a first cell compartment for containing a first fuel component;

a second cell compartment for containing a second fuel component; and a fuel activation assembly disposed between the first cell compartment and the second cell compartment, the fuel activation assembly comprising:

a substrate having a plurality of apertures; and a plurality of membrane electrode assembly segments securely attached to the substrate over the apertures, wherein each membrane electrode assembly segment has a first side and an opposing second side, the second side adjacent the second cell compartment, the first side adjacent the first cell compartment for activating the first fuel component to produce protons in an activation process and for channeling at least part of the protons from the first cell compartment to the second cell compartment via the apertures through the membrane electrode assembly segments.

The activation process produces an electrical current, and the fuel cell further comprises:

a first electrically conducting terminal operatively connected to the first cell compartment; and a second electrically conducting terminal operatively connected to the second cell compartment, so as to allow a current load to connect to the first and second electrically conducting terminals to use the electrical current.

The first fuel component comprises substantially a mixture of water and alcohol, and the substrate is resistant to water and alcohol. The alcohol comprises substantially methanol. The second fuel component comprises substantially air.

Each membrane electrode assembly segment comprises a proton exchange membrane disposed between two electrode layers.

Each membrane electrode assembly segment further comprises two diffusion layers, each covering one of the electrode layers.

According to the third aspect of the present invention, there is provided a membrane electrode assembly for use in a fuel cell. The fuel cell comprises:

a first cell compartment containing a first fuel component; and a second cell compartment containing a second fuel component, said membrane electrode assembly comprising:

a substrate having a plurality of apertures; and a plurality of fuel activation segments securely attached to the substrate over the apertures, wherein each fuel activation segment has a first side and an opposing second side, the second side adjacent the second cell compartment, the first side adjacent the first cell compartment, for activating the first fuel component in order to produce protons in an activation process, and for channeling at least part of the protons from the first cell compartment to the second cell compartment via the apertures through the membrane electrode assembly segments.

Advantageously, each fuel activation segment comprises:
a first electrode layer on the first side;
a second electrode layer on the second side; and
a proton exchange membrane disposed between the first and second electrode layers.

The first electrode layer and the second electrode layer of each fuel activation segment are operatively connected to the first electrode layer and the second electrode layer, respectively, of other fuel active segments such that the fuel activation segments are electrically connected in parallel.

Advantageously, at least some of the fuel activation segments are electrically connected in series, such that the first electrode layer and the second electrode layer of each of said at least some of the fuel activation segments are operatively connected to different ones of the first and second electrode layers of different fuel activation segments. Alternatively, the fuel activation segments are electrically connected in a combination of a series connection and a parallel connection.

According to the fourth aspect of the present invention, there is provided a portable electronic device comprising:
an electronic unit for processing signals or data; and
a fuel cell for providing electricity to the electronic unit, the fuel cell comprising:
a first cell compartment containing a first fuel component;
a second cell compartment containing a second fuel component; and
a fuel activation assembly disposed between the first cell compartment and the second cell compartment, the fuel activation assembly comprising:
a substrate having a plurality of apertures; and
a plurality of membrane electrode assembly segments securely attached to the substrate over the apertures, wherein each membrane electrode assembly segment has a first side and an opposing second side, the second side adjacent the second cell compartment, the first side adjacent the first cell compartment, for activating the first fuel component in order to produce protons in an activation process and for channeling at least part of the protons from the first cell compartment to the second cell compartment via the apertures through the membrane electrode assembly segments.

The portable electronic device can be a notebook computer, a laptop computer, a tablet computer, a personal digital assistant device, or the like.

The present invention will become apparent upon reading the description taken in conjunction with FIGS. 2-8.

BRIEF DESCRIPTION OF THE DRAWINGS

FIG. 2b is an exploded view of the fuel cell stack of FIG. 2a.

BEST MODE FOR CARRYING OUT THE INVENTION

Figure 2A:
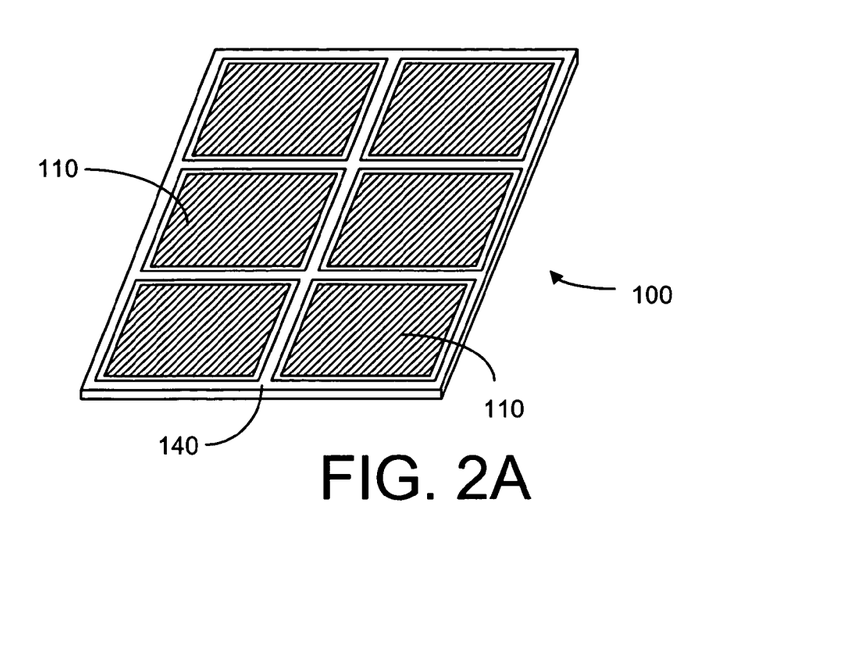
FIG. 2a is a schematic representation illustrating an embodiment of the fuel cell stack in a fuel cell, according to the present invention.
Figure 2B:
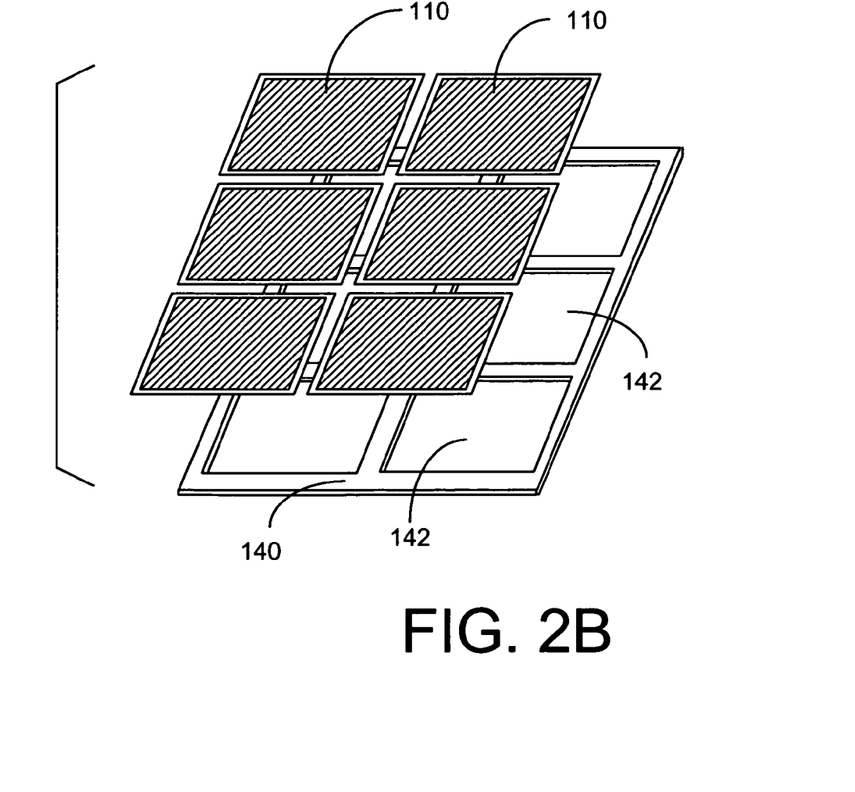

The fuel cell, according to the present invention, comprises a plurality of MEA (membrane electrode assembly) segments, each of which has a separate PEM (proton-exchange membrane) and two electrode/diffusion layers for catalytic activation. As shown in FIGS. 2a and 2b, a fuel cell stack 100 comprises a substrate 140 having a plurality of openings 142, and a plurality of MEA segments 110 securely attached to the substrate 140, with each MEA segment 110 at an opening 142. The substrate 140 is made of a material that is stiff enough to serve as a mechanical frame for supporting the MEA segments. At the same time, the material is also resistant to methanol. For example, the substrate 140 can be made of Teflon, or FR4 (a laminate made of woven fiberglass fabric saturated with an epoxy resin).

Figure 3:
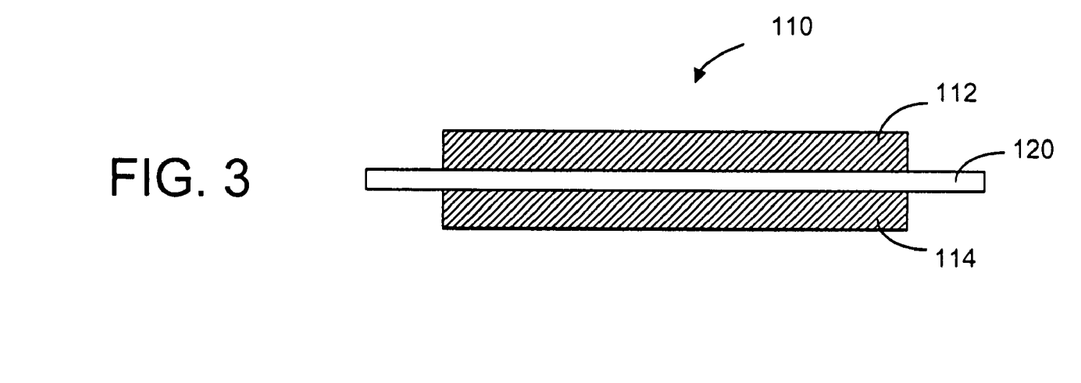
FIG. 3 is a schematic representation illustrating an MEA segment of the present invention.

The MEA segment 110, as shown in FIG. 3, substantially comprises a proton exchange membrane (PEM) 120 disposed between two activation layers 112 and 114. It is understood that the activation layer 112 comprises a diffusion layer and an electrode disposed between the diffusion layer and the PEM 120. Likewise, the activation layer 114 comprises a diffusion layer and an electrode adjacent to the PEM 120. These MEA components are known in the art.

Figure 4A:
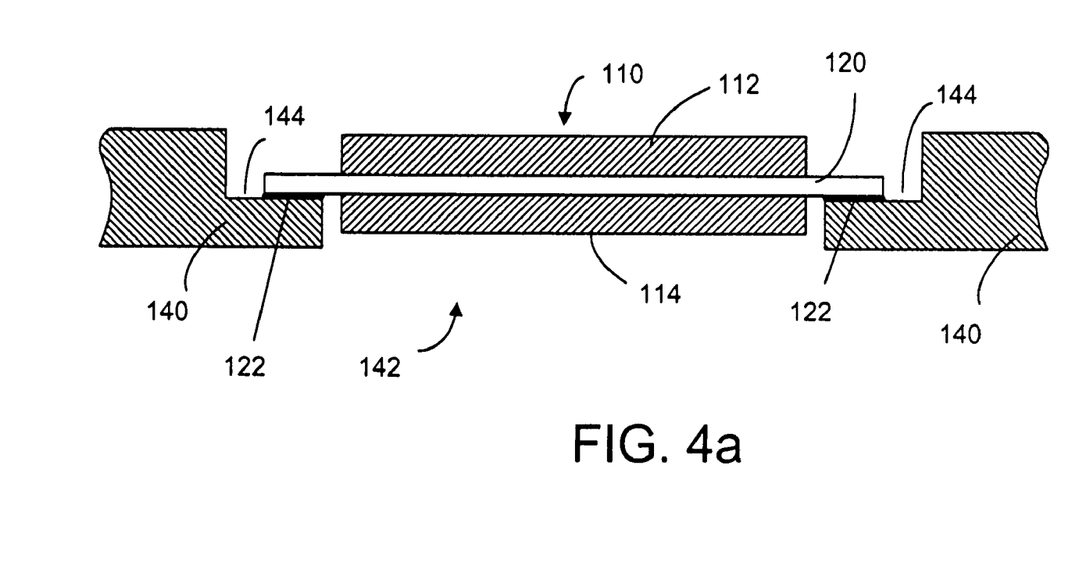
FIG. 4a is a schematic representation illustrating the attachment of an MEA segment to the substrate, according to the present invention.
Figure 4B:
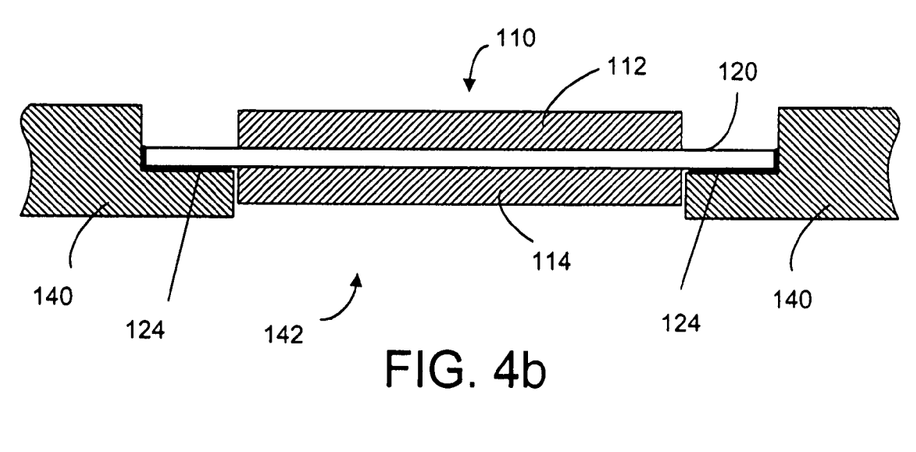
FIG. 4b is a schematic representation illustrating a different way to attach an MEA segment to the substrate.

Preferably, each of the openings 142 on the substrate 140 has a step-like recess 144 around its edges so as to allow an MEA segment 110 to be attached therein, as shown in FIGS. 4a and 4b. If the PEM 120 is made of a material that is compatible with the substrate 140, the MEA segment 110 can be bonded to substrate 120 using a heat bonding process, for example. The heat bonding area is denoted by reference number 122, as shown in FIG. 4a. Alternatively, the MEA segment 110 is attached to the substrate 120 by an adhesive layer 124 that is resistant to methanol. It is essential that the bonding area 122 or the adhesive layer 124 provides a leak-proof seal around the edges of the MEA segments in order to prevent liquid methanol from leaking from one side to the other side of the substrate 140.

Figure 4C:
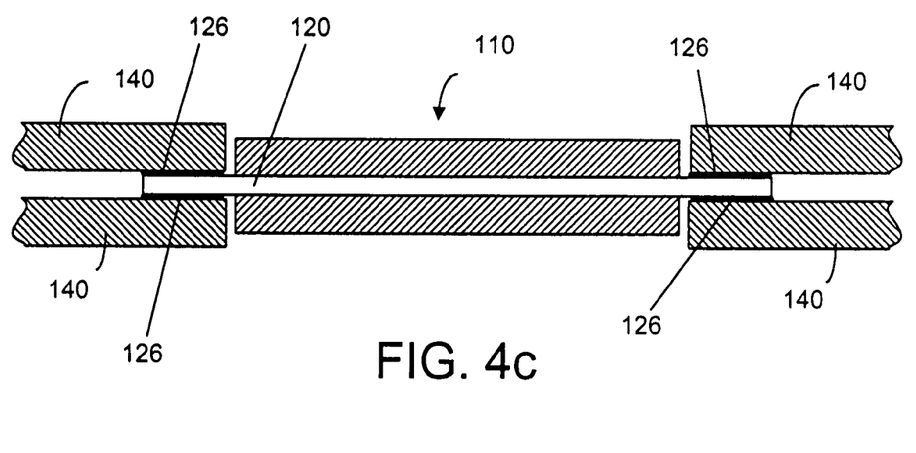
FIG. 4c is a schematic representation illustrating yet another way to attach a MEA segment to the substrate.

Alternatively, two substrates 140 can be used to secure the MEA segments 110 with an appropriate bonding material 126, as shown in FIG. 4c.

Figure 5:
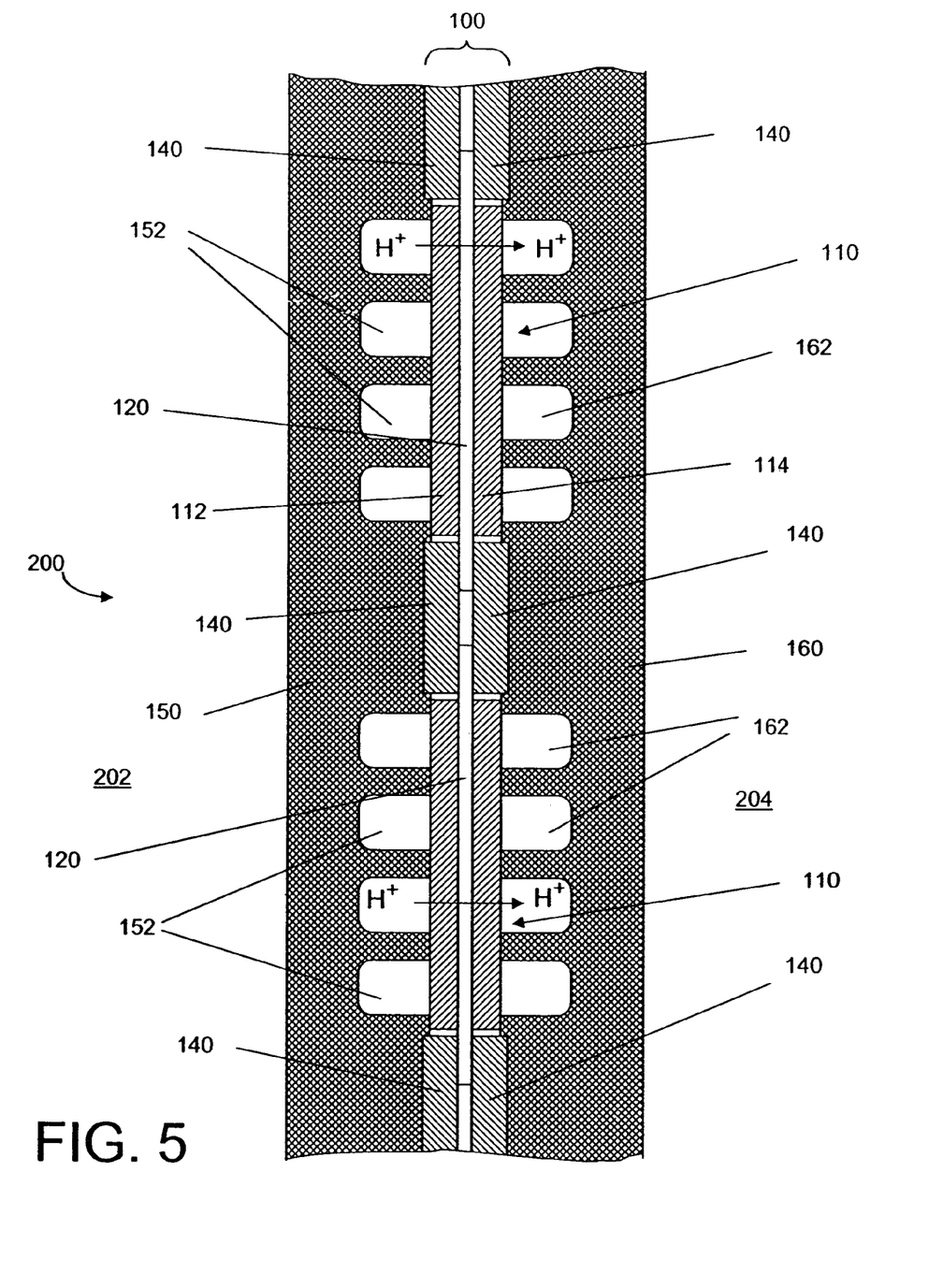
FIG. 5 is a schematic representation illustrating a method for collecting electrical current from the MEA segments.

In a fuel cell 200, the fuel cell stack 100 can be sandwiched between two current collectors 150, 160 as shown in FIG. 5. The current collector 150 has a plurality of channels 152 to allow the liquid methanol to circulate around the MEA segments 110 on the anode side 202. Likewise, the current collector 160 has a plurality of channels 162 to allow air to circulate around the MEA segments 110 on the cathode side 204. The current collectors 150 and 160 can be designed such that they also provide mechanical support to the fuel cell stack 100. With the arrangement as shown in FIG. 5, each of the MEA segments 110 acts like a separate fuel cell unit and all of the MEA segments 110 on the substrate 140 are electrically connected in parallel.

Figure 6A:
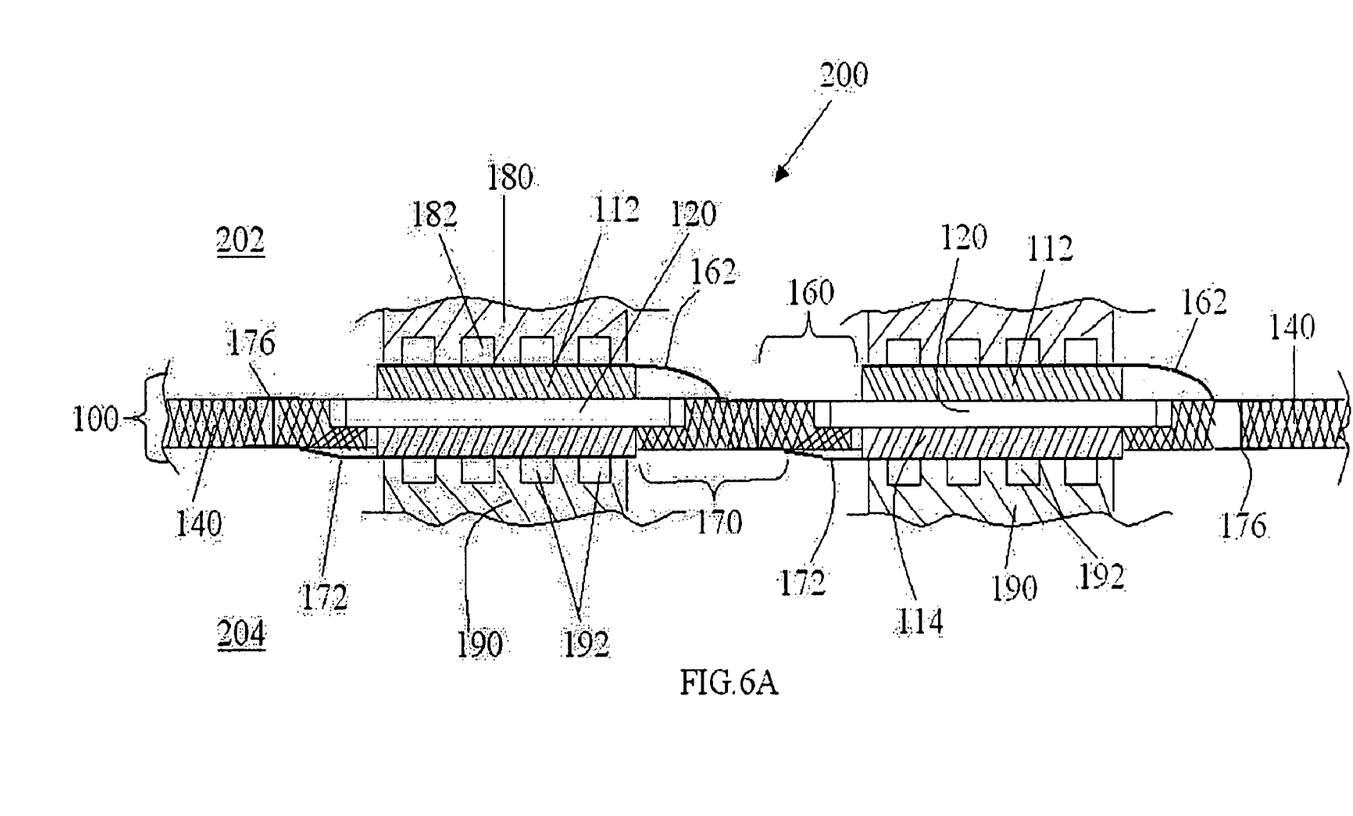
FIG. 6a is a schematic representation illustrating a different method for collecting electrical current from the MEA segments.
Figure 6B:
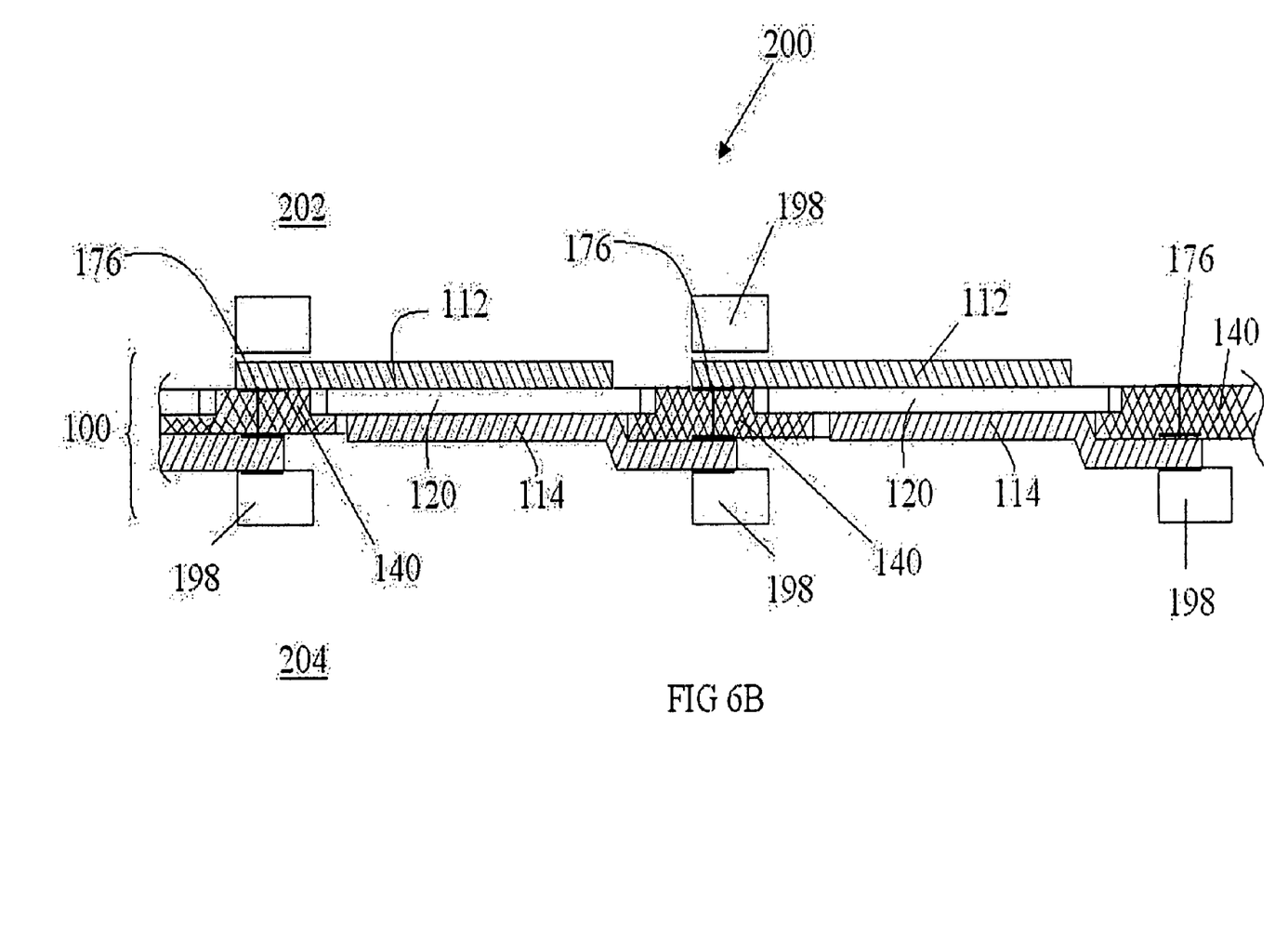
FIG. 6b is a schematic representation illustrating yet another way to collect electrical current from the MEA segments.

Alternatively, the MEA segments 110 can also be electrically connected in series, as shown in FIGS. 6a and 6b. As shown in FIG. 6a, a net-like structure 171 is used to collect the electrical charge on the anode side 202 of the fuel cell 200, and a similar structure 170 is used to collect the electrical charge on the cathode side 204 of the fuel cell 200. The structure 171 comprises a plurality of electrically conductive segments 173, each of which is disposed in the proximity of the anode side of an MEA segment 110. Likewise, the structure 170 comprises a plurality of electrically conductive segments 172, each of which is disposed in the proximity of the cathode side of an MEA segment 110. The substrate 140 further has a plurality of electrically conductive connectors or feed-throughs 176 for electrically connecting one electrically conductive segment 173 to one electrically conductive segment 172. The MEA segments 110 so connected are effectively a plurality of fuel cell units connected in series. Preferably, an electrically non-conductive housing 180 is used to support the fuel cell stack 100 and the net-like structure 171 on the anode side 202, and another electrically non-conductive housing 190 is used to support the fuel cell stack 100 and net-like structure 170 on the cathode side. It is understood that the net-like structures 170, 171 are designed such that while the electrically conductive segments 173, along with the electrically conductive segments 172, can be used to collect electrical current efficiently, the electrically conductive segments 172, 173 also allow liquid methanol and air to circulate sufficiently around the MEA segments 110 via the flow channels 182 in the housing 180 and the flow channels 192 in the housing 190.

In a different embodiment of the present invention, each of the activation layers 112 and 114 is extended beyond the PEM 120 so that it can be electrically connected to a feed-through 176, as shown in FIG. 6b. As mentioned above, the activation layer 112 comprises an electrode facing the PEM 120 and the activation layer 114 also comprises an electrode facing the PEM 120. Through the feed-through 176, the electrode on the activation layer 112 of one MEA segment 110 is electrically connected to the electrode on the activation layer 114 of an adjacent MEA segment 110. The MEA segments 110 so connected are also effectively a plurality of fuel cell units connected in series. Advantageously, the fuel cell 200 also has a housing 198 to provide mechanical support to the fuel cell stack 100.

It is understood that the electrical connection among the MEA segments 110 in a fuel cell stack 100 can also be a combination of series connection and parallel connection. The combination can be tailored to suit the voltage and power requirements of a portable electronic device.

FIGS. 2a, 2b, 4a to 6b illustrate a fuel cell stack 100 in a fuel cell 200. The fuel cell stack 100 comprises a plurality of MEA segments 110, as shown in FIG. 3. Each of the MEA segments 110 comprises a pair of activation layers attached to a PEM 120 on opposite sides thereof. As such, each MEA segment 110 can be considered as being the component of a single cell. When a fuel cell 200 is defective due to inefficiency of proton exchange, it is possible that only one or two of such single cells are defective. In such cases, it is possible to replace only the MEA segment 110 of the defective single cells. Because the PEM is usually the most expensive component in a fuel cell, replacing a small PEM in an MEA segment 110 is more economical than discarding the entire PEM in a prior art fuel cell as depicted in FIG. 1.

Furthermore, when a fuel cell is fabricated to suit the size or the power consumption of a portable electronic device, it is possible to use a different number of MEA segments to fit the size of the fuel cell 200. For example, it is possible to fabricate one fuel cell with 4×6 MEA segments and to fabricate another fuel cell with 5×7 MEA segments of the same size. In contrast, with the prior art fuel cells, one must have PEMs of different sizes to suit the size of different portable electronic devices.

Figure 7A:
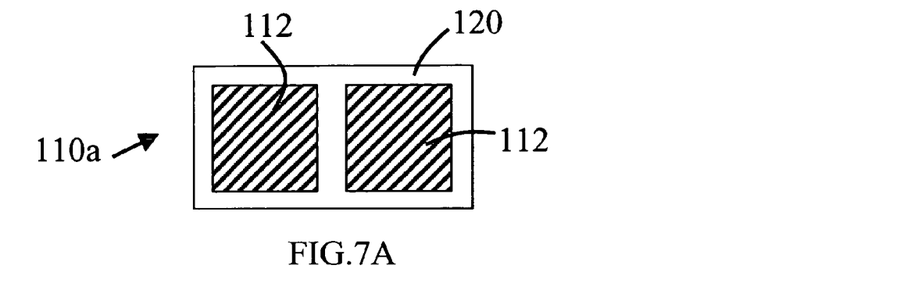
FIG. 7a is a schematic representation illustrating a two-cell MEA segment.
Figure 7B:
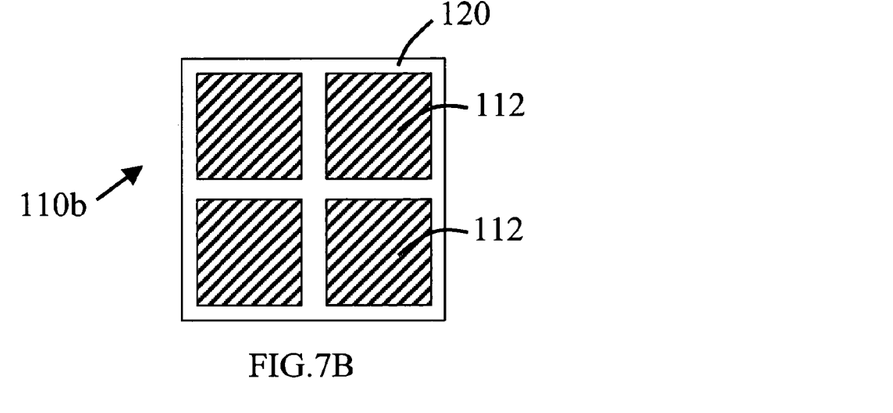
FIG. 7b is a schematic representation illustrating a four-cell MEA segment.
Figure 7C:
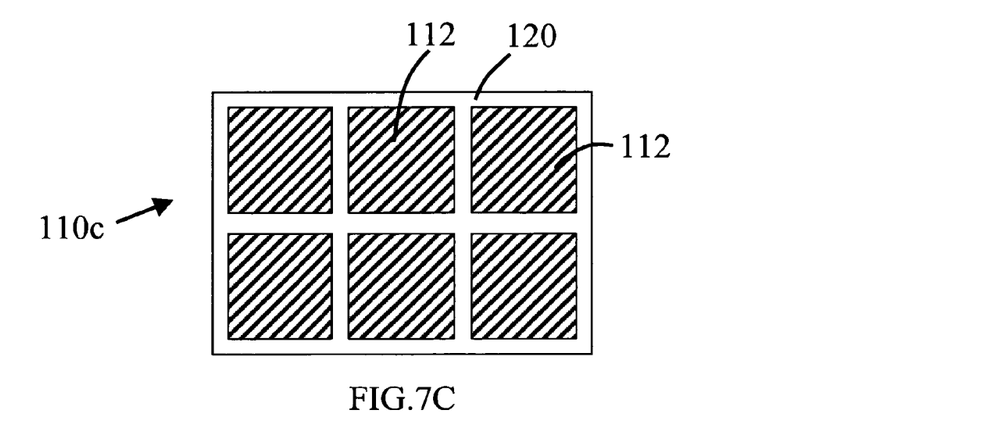
FIG. 7c is a schematic representation illustrating a six-cell MEA segment.

It should be noted that each MEA segment can be made of two or more pairs of activation layers attached to a PEM 120 on opposite sides thereof. As shown in FIG. 7a, each MEA segment 110a comprises two activation layers 112 and two activation layers 114 (not shown), attached to opposite sides of a PEM 120. As such, each MEA segment 110a can be considered as the component of two cells. As shown in FIG. 7b, each MEA segment 110b comprises four activation layers 112 and four activation layers 114 (not shown), attached to opposite sides of a PEM 120. Similarly, each MEA segment 110c comprises six activation layers 112 and six activation layers 114 (not shown), attached to opposite sides of a PEM 120. With different MEA segments, it is possible to combine those MEA segments to form a fuel cell of a certain size. For example, when it is desirable to fabricate a fuel cell using a substrate 140 having 2×3 openings as shown in FIG. 2b, it is possible to use 3 two-cell MEA segments 110a (see FIG. 7a), but it is also possible to combine one two-cell MEA segment 110a and one four-cell MEA segment 110b (see FIG. 7b). One may also use only one six-cell MEA segment 110c to fabricate a fuel cell of the same size. However, as the number of cells on a single MEA segment increases, the area of the PEM 120 also increases. The cost effectiveness in replacing a PEM in a defective cell is reduced accordingly. Nevertheless, multiple-cell MEA segments offer a convenient way in fabricating fuel cells for portable electronic devices of various sizes.

It should be noted that the individual "cell" in a single or multiple-cell MEA segment can be square, or rectangular with a certain aspect ratio to suit a variety of fuel cell sizes. For example, the aspect ratio for the individual cell can be 4:3 or 5:4.

Figure 8:
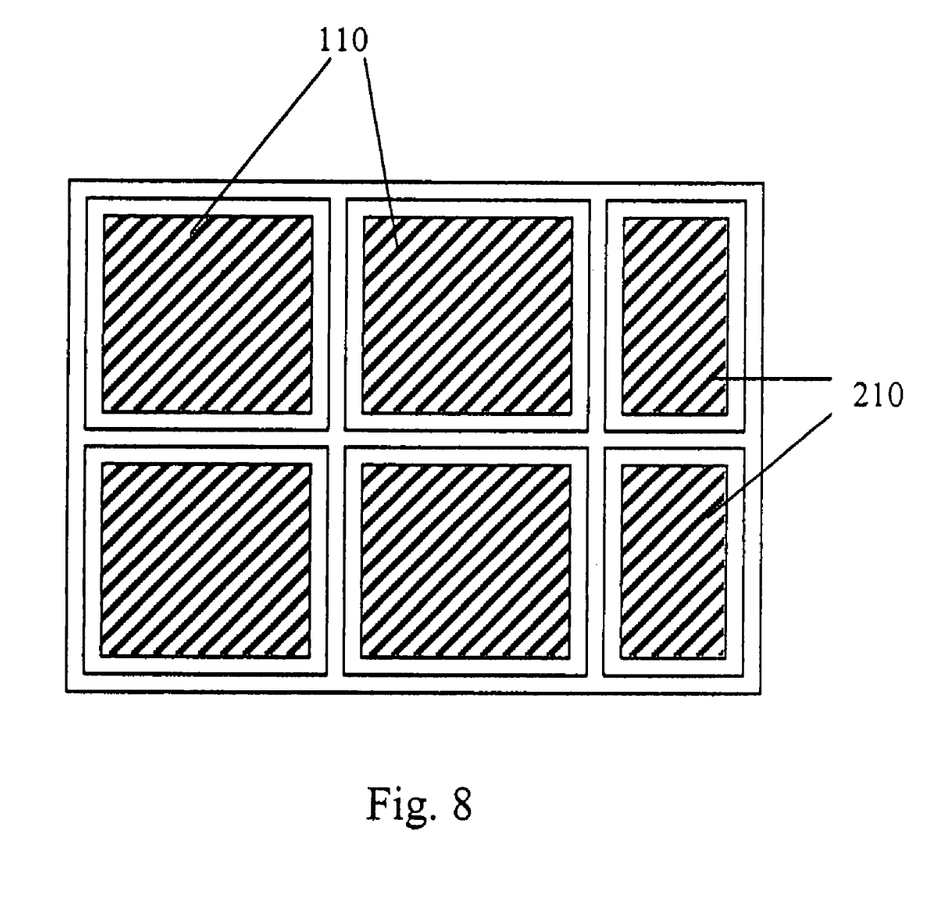
FIG. 8 is a schematic representation illustrating another embodiment of the fuel cell stack in a fuel cell, in which the sizes of MEA segments are different.

In addition, the size of MEA segments for a fuel-cell stack need not be the same. As seen in FIG. 8, two smaller MEA segments 210 are combined with 4 MEA segments 110.

In sum, the membrane electrode assembly in a fuel cell can be made of a plurality of segments, each having a separate proton exchange membrane. As such, it is possible to replace a defective segment, instead of discarding the entire membrane electrode assembly, if the fuel cell becomes defective. With membrane electrode assembly segments, fuel cells of various sizes can be made without using proton exchange membranes of different sizes. In a fuel cell having a plurality of membrane electrode assembly segments, it is possible to electrically connect the segments in series, in parallel or in a combination thereof.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of fabricating a fuel activation assembly for use in a fuel cell, the fuel cell comprising a first cell compartment for containing a reactant and a second cell compartment for containing an oxidant, wherein the fuel activation assembly is disposed between the first cell compartment and the second cell compartment so as to activate the reactant for producing protons in the first cell compartment and for channeling the protons to the second cell compartment, said method comprising the steps of:

providing a substantially planar substrate in the fuel cell, the substrate having a first surface facing the first cell compartment and an opposing second surface facing the second cell compartment, the substrate having a plurality of apertures made through the first surface and the second surface, wherein each of the apertures has a step-like recess; and securely attaching a plurality of membrane electrode assembly segments to the substrate over the apertures such that each of the membrane electrode assembly segments is attached in the recess of one aperture so that each membrane electrode assembly segment can be independently and separately replaced if needed, and wherein each membrane electrode assembly segment comprises a proton-exchange membrane sandwiched between two activation layers, wherein each membrane electrode assembly segment has a first side and an opposing second side, the second side adjacent to the second cell compartment, the first side adjacent to the first cell compartment for activating the reactant in order to produce the protons and for channeling at least part of the protons from the first cell compartment to the second cell compartment via the apertures through the membrane electrode assembly segments.

2. The method of claim 1, wherein said attaching is achieved by a heat bonding process, creating a barrier separating the first side from the second side of each membrane electrode segment, thereby preventing the reactant from entering the second cell compartment and the oxidant from entering the first cell compartment.

3. The method of claim 1, wherein said attaching is achieved by applying an adhesive layer between the substrate and the membrane electrode assembly segments, creating a barrier separating the first side from the second side of each membrane electrode segment, thereby preventing the reactant from entering the second cell compartment and the oxidant from entering the first cell compartment.

4. The method of claim 3, wherein the reactant comprises substantially a mixture of water and alcohol, and the adhesive layer is resistant to water and alcohol.

5. A fuel cell comprising:
a first cell compartment for containing a reactant;
a second cell compartment for containing an oxidant; and
a fuel activation assembly disposed between the first cell compartment and the second cell compartment, the fuel activation assembly comprising:
a substantially planar substrate having a first surface facing the first cell compartment and an opposing second surface facing the second cell compartment, the substrate having a plurality of apertures made through the first surface and the second surface, wherein each of the apertures has a step-like recess; and
a plurality of membrane electrode assembly segments securely attached to the substrate over the apertures such that each of the membrane electrode assembly segments is attached in the recess of one aperture so that each membrane electrode assembly segment can be independently and separately replaced if needed, each of the membrane electrode assembly segment comprising a proton-exchange membrane sandwiched between two activation layers, wherein each membrane electrode assembly segment has a first side and an opposing second side, the second side adjacent the second cell compartment, the first side adjacent the first cell compartment for activating the reactant to produce protons in an activation process and for channeling at least part of the protons from the first cell compartment to the second cell compartment via the apertures through the membrane electrode assembly segments.

6. The fuel cell of claim 5, wherein the activation process produces an electrical current, said fuel cell further comprising
a first electrically conducting terminal operatively connected to the first cell compartment; and
a second electrically conducting terminal operatively connected to the second cell compartment, so as to allow a current load to connect to the first and second electrically conducting terminals to use the electrical current.

7. The fuel cell of claim 5, wherein the reactant comprises substantially a mixture of water and alcohol, and the substrate is resistant to water and alcohol.

8. The fuel cell of claim 7, wherein the alcohol comprises substantially methanol.

9. The fuel cell of claim 7, wherein the oxidant comprises substantially air.

10. The fuel cell of claim 5, wherein each membrane electrode assembly segment comprises a proton exchange membrane disposed between two electrode layers.

11. The fuel cell of claim 10, wherein each membrane electrode assembly segment further comprises two diffusion layers, each covering one of the electrode layers.

12. A membrane electrode assembly for use in a fuel cell, the fuel cell comprising:
a first cell compartment containing a reactant; and
a second cell compartment containing an oxidant, said membrane electrode assembly comprising:
a substantially planar substrate having a first surface, an opposing second surface, and a plurality of apertures made through the first and second surfaces, wherein each of the apertures has a step-like recess; and
a plurality of fuel activation segments securely attached to the substrate over the apertures such that each of the membrane electrode assembly segments is attached in the recess of one aperture so that each membrane electrode assembly segment can be independently and separately replaced if needed, each of the fuel activation segment comprising a proton-exchange membrane sandwiched between two activation layers, wherein each fuel activation segment has a first side and an opposing second side, the second side adjacent the second cell compartment, the first side adjacent the first cell compartment, for activating the reactant in order to produce protons in an activation process, and for channeling at least part of the protons from the first cell compartment to the second cell compartment via the apertures through the membrane electrode assembly segments.

13. The membrane electrode assembly of claim 12, wherein each fuel activation segment comprises:
a first electrode layer on the first side;
a second electrode layer on the second side; and
a proton exchange membrane disposed between the first and second electrode layers.

14. The membrane electrode assembly of claim 13, wherein the first electrode layer and the second electrode layer of each fuel activation segment are operatively connected to the first electrode layer and the second electrode layer, respectively, of other fuel active segments such that the fuel activation segments are electrically connected in parallel.

15. The membrane electrode assembly of claim 13, wherein at least some of the fuel activation segments are electrically connected in series, such that the first electrode layer and the second electrode layer of each of said at least some of the fuel activation segments are operatively connected to different ones of the first and second electrode layers of different fuel activation segments.

16. The membrane electrode assembly of claim 13, wherein the fuel activation segments are electrically connected in a combination of a series connection and a parallel connection.

17. A portable electronic device comprising:
an electronic unit for processing signals or data; and
a fuel cell for providing electricity to the electronic unit, the fuel cell comprising:
   a first cell compartment containing a reactant;
   a second cell compartment containing an oxidant; and
   a fuel activation assembly disposed between the first cell compartment and the second cell compartment, the fuel activation assembly comprising:
      a substantially planar substrate having a first surface facing the first cell compartment and an opposing second surface facing the second cell compartment, the substrate having a plurality of apertures made through the first and second surfaces, wherein each of the apertures has a step-like recess; and
      a plurality of membrane electrode assembly segments securely attached to the substrate over the apertures such that each of the membrane electrode assembly segments is attached in the recess of one aperture so that each membrane electrode assembly segment can be independently and separately replaced if needed, each of the membrane electrode assembly segment comprising a proton-exchange membrane sandwiched between two activation layers, wherein each membrane electrode assembly segment has a first side and an opposing second side, the second side adjacent the second cell compartment, the first side adjacent the first cell compartment, for activating the reactant in order to produce protons in an activation process and for channeling at least part of the protons from the first cell compartment to the second cell compartment via the apertures through the membrane electrode assembly segments.

18. The portable electronic device of claim 17, comprising a notebook computer.

19. The portable electronic device of claim 17, comprising a laptop computer.

20. The portable electronic device of claim 17, comprising a tablet computer.

21. The portable electronic device of claim 17, comprising a personal digital assistant device.

* * * * *

UNITED STATES PATENT AND TRADEMARK OFFICE
CERTIFICATE OF CORRECTION

PATENT NO. : 7,521,145 B2  Page 1 of 1
APPLICATION NO. : 10/687232
DATED : April 21, 2009
INVENTOR(S) : Chang et al.

It is certified that error appears in the above-identified patent and that said Letters Patent is hereby corrected as shown below:

On the Title Page, Item 56 Foreign Patent Document should be --WO 200280299--.

Signed and Sealed this

Second Day of June, 2009

JOHN DOLL
*Acting Director of the United States Patent and Trademark Office*